United States Patent
Noh et al.

(10) Patent No.: US 12,512,468 B2
(45) Date of Patent: Dec. 30, 2025

(54) CATHODE ACTIVE MATERIAL PRECURSOR AND LITHIUM SECONDARY BATTERY UTILIZING SAME

(71) Applicant: SK INNOVATION CO., LTD., Seoul (KR)

(72) Inventors: Mi Jung Noh, Daejeon (KR); Jik Soo Kim, Daejeon (KR); Sang Bok Kim, Daejeon (KR); Dong Wook Ha, Daejeon (KR)

(73) Assignee: SK On Co., Ltd., Seoul (KR)

( * ) Notice: Subject to any disclaimer, the term of this patent is extended or adjusted under 35 U.S.C. 154(b) by 988 days.

(21) Appl. No.: 17/041,959

(22) PCT Filed: Mar. 28, 2019

(86) PCT No.: PCT/KR2019/003624
§ 371 (c)(1),
(2) Date: Sep. 25, 2020

(87) PCT Pub. No.: WO2019/190217
PCT Pub. Date: Oct. 3, 2019

(65) Prior Publication Data
US 2021/0098787 A1      Apr. 1, 2021

(30) Foreign Application Priority Data

Mar. 28, 2018  (KR) .................. 10-2018-0035933
Mar. 22, 2019  (KR) .................. 10-2019-0033031

(51) Int. Cl.
| H01M 4/525 | (2010.01) |
| C01G 53/50 | (2025.01) |
| C01G 53/82 | (2025.01) |
| H01M 4/505 | (2010.01) |
| H01M 10/0525 | (2010.01) |
| H01M 4/02 | (2006.01) |

(52) U.S. Cl.
CPC ............ *H01M 4/525* (2013.01); *C01G 53/50* (2013.01); *C01G 53/82* (2025.01); *H01M 4/505* (2013.01); *H01M 10/0525* (2013.01); *C01P 2002/74* (2013.01); *H01M 2004/021* (2013.01); *H01M 2004/028* (2013.01)

(58) Field of Classification Search
None
See application file for complete search history.

(56) References Cited

FOREIGN PATENT DOCUMENTS

| CN | 105226266 | * | 1/2016 |
| CN | 106997948 | * | 8/2017 |
| CN | 107394193 A | | 11/2017 |
| JP | 07094182 A | | 4/1995 |
| JP | 09268016 A | | 10/1997 |
| JP | 11060243 A | | 3/1999 |
| JP | 2004-119218 A | | 4/2004 |
| JP | 3871518 B2 | | 1/2007 |
| JP | WO2014/049966 A1 | | 4/2014 |
| JP | 2017-033669 A | | 2/2017 |
| KR | 10-2006-0127272 A | | 12/2006 |
| KR | 10-0815583 B1 | | 3/2008 |
| KR | 10-0821523 B1 | | 4/2008 |
| KR | 10-2008-0048442 A | | 6/2008 |
| KR | 10-2011-0136002 A | | 12/2011 |
| KR | 10-2015-0078672 A | | 7/2015 |
| KR | 10-2015-0104675 A | | 9/2015 |
| WO | 2016060451 | * | 4/2016 |
| WO | 2018-020845 A1 | | 2/2018 |

OTHER PUBLICATIONS

Watanabe et al. "Thermodynamic studies of cobalt and cadmium . . . ". Journal of Power Sources. 76. 167-174 (1998) (Year: 1998).*
The Concept of Peak Shape. Birkbeck College, University of London. 1997 (Year: 1997).*
Speakman, Scott, PhD. "Basics of XRay Powder Diffraction". http://prism.mit.edu/xray. 2011 (Year: 2011).*
Daniel, et al. "Cathode Materials Review". AIP Conf Proceedings. (2014). (Year: 2014).*
Chi, et al. "Nickel/Cobalt oxide as a highly efficient OER electrocatalyst . . . ". RSC Advances. 6. 90397 (2016) (Year: 2016).*
Office Action for Korean Patent Application No. 10-2019-0033031 issued by the Korean Patent Office on Jul. 11, 2022.
Office Action for the Chinese Patent Application No. 201980023350.0 issued by the Chinese Patent Office on May 31, 2023.

* cited by examiner

*Primary Examiner* — Sheng H Davis
(74) *Attorney, Agent, or Firm* — IP & T GROUP LLP (57) ABSTRACT

A cathode active material precursor according to embodiments of the present invention includes nickel (Ni) and cobalt (Co) and includes an excess amount of Ni. $A_{101}/A_{001}$ is 1 or more and $I_{101}/I_{001}$ is 1 or more. $A_{101}$ is a peak area of (101) plane, and $A_{001}$ is a peak area of (001) plane by an X-ray diffraction (XRD) analysis, and $I_{101}$ is a peak intensity of (101) plane, and $I_{001}$ is a peak intensity of (001) plane by the XRD analysis. A cathode and a lithium secondary battery having improved crystallinity and long-term stability using the cathode active material precursor.

8 Claims, 6 Drawing Sheets

CATHODE ACTIVE MATERIAL PRECURSOR AND LITHIUM SECONDARY BATTERY UTILIZING SAME

BACKGROUND

1. Field

The present application is a national stage application of PCT/KR2019/003624 filed on Mar. 28, 2019, which claims the benefit of Korean Patent Applications No. 10-2018-0035933 filed on Mar. 28, 2018 and No. 10-2019-0033031 filed on Mar. 22, 2019. The disclosures of which are incorporated by reference herein in their entirety.

2. Description of the Related Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is actively developed and applied due to high operational voltage and energy density per unit weight, a high charging rate, a compact dimension, etc.

For example, the lithium secondary battery may include an electrode assembly including a cathode, an anode and a separation layer (a separator), and an electrolyte immersing the electrode assembly. The lithium secondary battery may further include an outer case having, e.g., a pouch shape for accommodating the electrode assembly and the electrolyte.

A lithium metal oxide may be used as an active material for a cathode of a lithium secondary battery. An example of the lithium metal oxide may include a nickel-based lithium metal oxide. To prepare the nickel-based lithium metal oxide, a nickel-containing precursor compound is used.

Recently, as an application of the lithium secondary battery has been expanded from a compact electronic device to a large-scaled device such as a hybrid vehicle, a nickel amount is increased for achieving sufficient capacity and power properties. In this case, a nickel ratio is increased in the nickel-containing precursor. However, as the nickel amount becomes greater, a reliability of the cathode active material may be degraded due to a mismatch or a side-reaction with lithium.

For example, Korean Registered Patent Publication No. 10-0821523 discloses a method of manufacturing a cathode active material using a lithium composite metal oxide, but fails to consider the aforementioned nickel-containing precursor.

SUMMARY

According to an aspect of the present invention, there is provided a cathode active material precursor providing improved power and stability.

According to an aspect of the present invention, there is provided a cathode active material and a lithium secondary battery manufactured from a cathode active material precursor providing improved power and stability.

A cathode active material precursor according to exemplary embodiments includes nickel (Ni) and cobalt (Co) and includes an excess amount of Ni, and A101/A001 is 1 or more and I101/I001 is 1 or more. A101 is a peak area of (101) plane, and A001 is a peak area of (001) plane by an X-ray diffraction (XRD) analysis, and I101 is a peak intensity of (101) plane, and I001 is a peak intensity of (001) plane by the XRD analysis.

In some embodiments, $A_{101}/A_{001}$ may be in a range from 1 to 2.

In some embodiments, $I_{101}/I_{001}$ is in a range from 1 to 2.

In some embodiments, cathode active material precursor is represented by Chemical Formula 1.

$$Ni_{1-x-y-z}Co_xMn_yM_z(OH)_{2+a} \qquad \text{[Chemical Formula 1]}$$

In Chemical Formula 1, $0.02 \leq x \leq 0.15$, $0 \leq y \leq 0.15$, $0 \leq z \leq 0.1$, $-0.5 \leq a \leq 0.1$, and M may include at least one of Mg, Sr, Ba, B, Al, Si, Mn, Ti, Zr or W.

In some embodiments, a content ratio of Ni among Ni, Co and Mn is in a range from 0.75 to 0.95.

In some embodiments, a content of Co may be greater than a content of Mn.

A cathode active material obtained from the cathode active material precursor is provided.

In some embodiments, the cathode active material may be represented by Chemical Formula 2.

$$Li_{1+b}Ni_{1-x-y-z}Co_xMn_yM_zO_{2+c} \qquad \text{[Chemical Formula 2]}$$

In Chemical Formula 2, $-0.05 \leq b \leq 0.15$, $0.02 \leq x \leq 0.15$, $0 \leq y \leq 0.15$, $0 \leq z \leq 0.1$, $-0.5 \leq c \leq 0.1$, and may include at least one of Mg, Sr, Ba, B, Al, Si, Mn, Ti, Zr or W.

In some embodiments, a length of a major axis of a primary particle is 1.5 to 7 times a length of a minor axis of the primary particle.

A lithium secondary battery according to exemplary embodiments includes a cathode including a cathode active material obtained from the cathode active material precursor, an anode and a separation layer disposed between the cathode and the negative anode.

A cathode active material precursor according exemplary embodiments may include, e.g., an excess amount of nickel to provide high power and high capacity. Additionally, the cathode active material precursor may have a predetermined range of $A_{101}/A_{001}$ from an XRD analysis to have an improved crystallinity.

Accordingly, a cathode active material and a lithium secondary battery having improved life-span and stability with high power and high capacity may be achieved using the cathode active material precursor.

DETAILED DESCRIPTION OF THE EMBODIMENTS

According to exemplary embodiments of the present invention, there is provided a cathode active material precursor which is a nickel-cobalt based precursor containing nickel (Ni) and cobalt (Co) in an embodiment for preparing a nickel-cobalt-manganese (NCM) based cathode active material and which have a predetermined range of A101/A001 from an X-ray diffraction analysis. According to exemplary embodiments of the present invention, a cathode active material prepared from the cathode active material precursor and a lithium secondary battery including a cathode prepared from the cathode active material are also provided.

Hereinafter, embodiments of the present invention will be described in detail with reference to the accompanying drawings. However, the embodiments are provided as exemplary examples, and the spirit of the present invention are not limited to those specific embodiments.

A cathode active material precursor according to exemplary embodiments of the present invention may include a nickel-cobalt-based compound, preferably a nickel-cobalt-manganese (NCM)-based compound, and may include, e.g., an NCM-based hydroxide.

In some embodiments, the cathode active material precursor may be represented by Chemical Formula 1 below.

[Chemical Equation 1]

In Chemical Formula 1, 0.02≤x≤0.15, 0≤y≤0.15, 0≤z≤0.1, −0.5≤a≤0.1. M represents a dopant or a transition metal. For example, M includes Mg, Sr, Ba, B, Al, Si, Mn, Zr or W. These may be used alone or in a combination of two or more thereof.

According to Chemical Formula 1, the cathode active material precursor may contain Ni in an excessive amount (e.g., in the largest amount) among metal elements included therein, and a content or a concentration (a molar ratio) of Ni may be about 0.6 or more. Accordingly, sufficient power and capacity of a secondary battery may be achieved from the use of excessive Ni.

In a preferable embodiment, the content of Ni may be adjusted in a range of about 0.75 to about 0.95.

As the amount of Ni content increases, a long-term storage stability and life-span stability of a cathode or a secondary battery may be relatively deteriorated. However, according to exemplary embodiments, while maintaining an electrical conductivity by including Co, life-span stability and capacity retention properties may be improved by using Mn. Additionally, long-term stability and high-temperature stability may be further improved by including M as the dopant.

In an embodiment, the content or concentration of Co may be greater than that of Mn. Accordingly, a resistance through the cathode active material may be reduced to increase a conductivity. A reduction of long-term stability of the capacity retention due to a relatively decreased amount or concentration of Mn may be supplemented or improved through a control of $A_{101}/A_{001}$, which will be described below.

In exemplary embodiments, the cathode active material precursor may have $A_{101}/A_{001}$ of 1 or more.

The term "$A_{101}$" as used herein refers to a peak area of (101) plane by an X-ray diffraction (XRD) analysis of the cathode active material precursor, and "$A_{001}$" refers to a peak area of (001) plane by the XRD analysis. Accordingly, $A_{101}/A_{001}$ represents an area ratio of the XRD peak of (101) plane relative to (001) plane.

In exemplary embodiments, the XRD analysis is performed using a Cu Kα ray as a light source using a powder sample dried at 110° C. to 250° C. after a synthesis of the cathode active material precursor, in a diffraction angle (2θ) range of 15° to 90° at a scan rate of 0.02°/step.

The cathode active material formed using the cathode active material precursor having the above range XRD analysis result may have an enhanced crystallinity, and thus high power and capacity properties may be stably maintained for a long period even during repeated charging and discharging operations.

Further, as described with reference to Chemical Formula 1, high capacity and power may be achieved by employing the excessive amount of Ni, and side effects due to an increase in the Ni content may be suppressed through the adjustment of $A_{101}/A_{001}$.

For example, when the content of Ni increases, a cation disorder may occur due to an exchange of Ni and lithium (Li), and Li ion sites may be occupied by Ni ions. Accordingly, a sufficient crystallinity of the cathode active material may not be obtained from the cathode active material precursor. Further, when a firing temperature is increased to increase the crystallinity, a desired crystal structure lay not be formed due to a topotactic transition by which lithium ions in the cathode active material precursor are substituted.

However, according to exemplary embodiments, the $A_{101}/A_{001}$ of the cathode electrode active material precursor may be adjusted to about 1 or more to obtain the cathode active material that may provide an excellent crystallinity while using high content of Ni without an excessive increase of the firing temperature. Accordingly, the secondary battery having high power, high capacity and long-term stability may be obtained.

In an embodiment, the $A_{101}/A_{001}$ of the cathode active material precursor may be controlled by changing an amount of $O_2$, a reaction time and a reaction temperature in a coprecipitation reaction for forming a precursor. In an embodiment, the $A_{101}/A_{001}$ may be adjusted in a range from about 1 to 2, preferably from about 1 to 1.6.

In exemplary embodiments, the cathode active material precursor may have $I_{101}/I_{001}$ of 1 or more.

The term "$I_{101}$" as used herein refers to a peak intensity (or a peak height) of (101) plane by an X-ray diffraction (XRD) analysis of the cathode active material precursor, and "$I_{001}$" refers to a peak intensity of (001) plane by the XRD analysis. Accordingly, $I_{101}/I_{001}$ represents an intensity ratio of the XRD peak of (101) plane relative to (001) plane.

In exemplary embodiments, both the area ratio ($A_{101}/A_{001}$) and the intensity ratio ($I_{101}/I_{001}$) as described above may be 1 or more, so that the improved crystallinity and a high Ni-content structure may be implemented more easily and effectively.

In some embodiments, the $I_{101}/I_{001}$ may be adjusted in a range from about 1 to 2, preferably from about 1 to 1.6.

The above-described cathode active material precursor may be prepared through a co-precipitation reaction of metal salts. The metal salts may include a nickel salt, a manganese salt and a cobalt salt.

Examples of the nickel salt may include nickel sulfate, nickel hydroxide, nickel nitrate, nickel acetate and a hydrate thereof. Examples of the manganese salt may include manganese sulfate, manganese acetate and a hydrate thereof. Examples of the cobalt salt may include cobalt sulfate, cobalt nitrate, cobalt carbonate and a hydrate thereof.

The metal salts may be mixed with a precipitating agent and/or a chelating agent in a ratio satisfying the content or concentration ratio of each metal described with reference to Chemical Formula 1 to prepare an aqueous solution. The aqueous solution may be co-precipitated in a reactor to prepare a cathode active material precursor.

The precipitating agent may include an alkaline compound such as sodium hydroxide (NaOH), sodium carbonate ($Na_2CO_3$), etc. The chelating agent may include, e.g., aqueous ammonia (e.g., $NH_3H_2O$), ammonium carbonate $NH_3HCO_3$), etc.

A temperature of the co-precipitation reaction may be adjusted in a range from, e.g., about 40° C. to 60° C. A reaction time may be adjusted in a range from about 24 to 72 hours.

According to exemplary embodiments, a cathode active material formed from the above-described cathode active material precursor is provided.

In exemplary embodiments, the cathode active material may be represented by Chemical Formula 2 below.

[Chemical Formula 2]

In Chemical Formula 2, −0.05≤b≤0.15, −0.5≤c≤0.1, and x, y, z and M are the same as those defined in Chemical Formula 1.

For example, a lithium precursor compound may be mixed with the cathode active material precursor and reacted through a co-precipitation to prepare the cathode active material. The lithium precursor compound may include, e.g., lithium carbonate, lithium nitrate, lithium acetate, lithium oxide, lithium hydroxide, etc. as a lithium salt. These may be used alone or in combination of two or more thereof.

Subsequently, lithium impurities or unreacted precursors may be removed by, e.g., a washing process, and metal particles may be fixed or crystallinity may be increased through a heat treatment.

In an embodiment, a temperature of the heat treatment may be in a range from about 600° C. to 1000° C.

In some embodiments, a primary particle of the cathode active material prepared from the cathode active material precursor may have a rod, an ellipse or a rod shape having different lengths of major and minor axes. In an embodiment, the length of the major axis of the primary particle may be about 1.5 to 7 times the length of the minor axis.

According to exemplary embodiments of the present invention, a lithium secondary battery including a cathode active material prepared from the above-described cathode material precursor.

Figure 1:
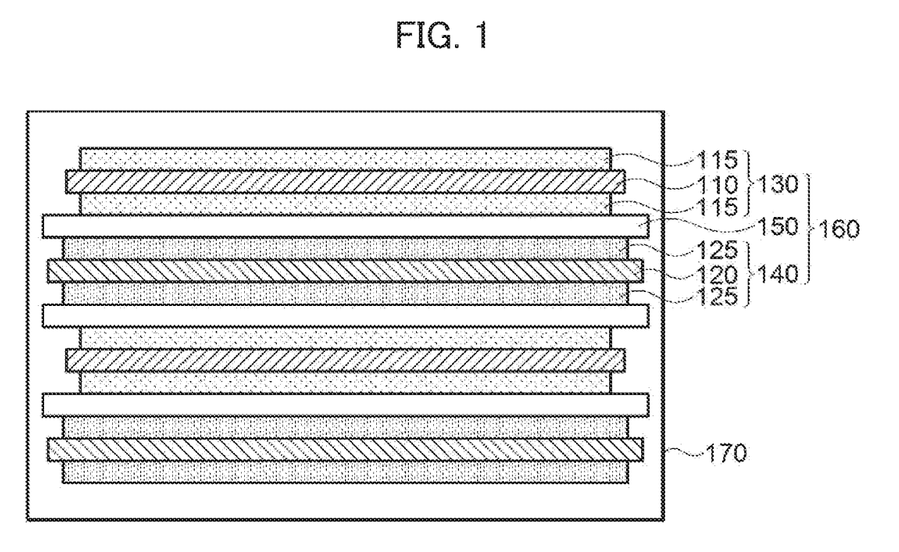
FIG. 1 is a schematic cross-sectional view illustrating a lithium secondary battery in accordance with some exemplary embodiments.
Figure 2A:
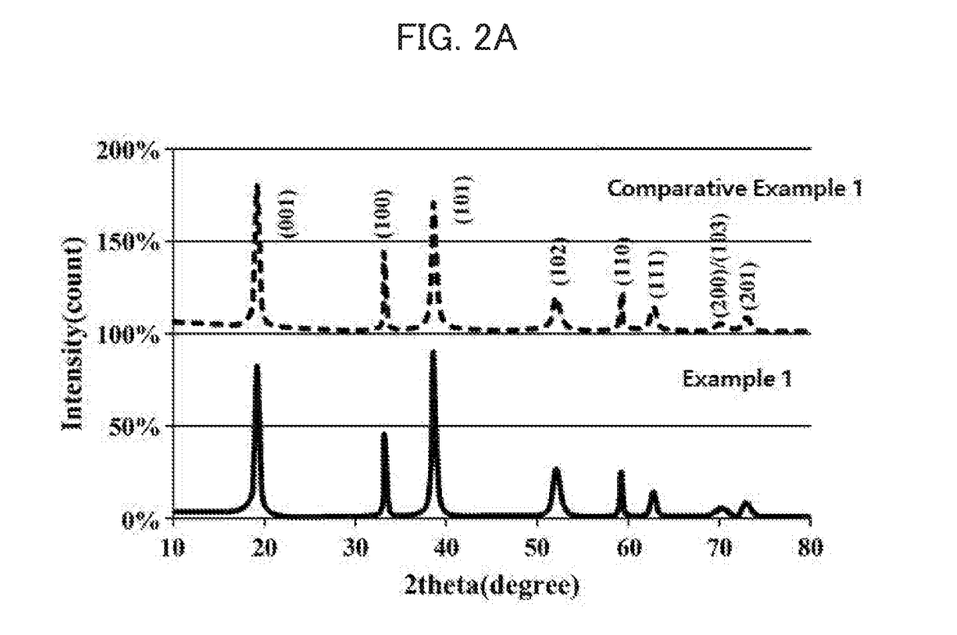
FIGS. 2A and 2B are graphs showing an XRD analysis of cathode active materials and a capacity retention analysis of lithium secondary batteries, respectively, in Example 1 and Comparative Example 1.
Figure 2B:
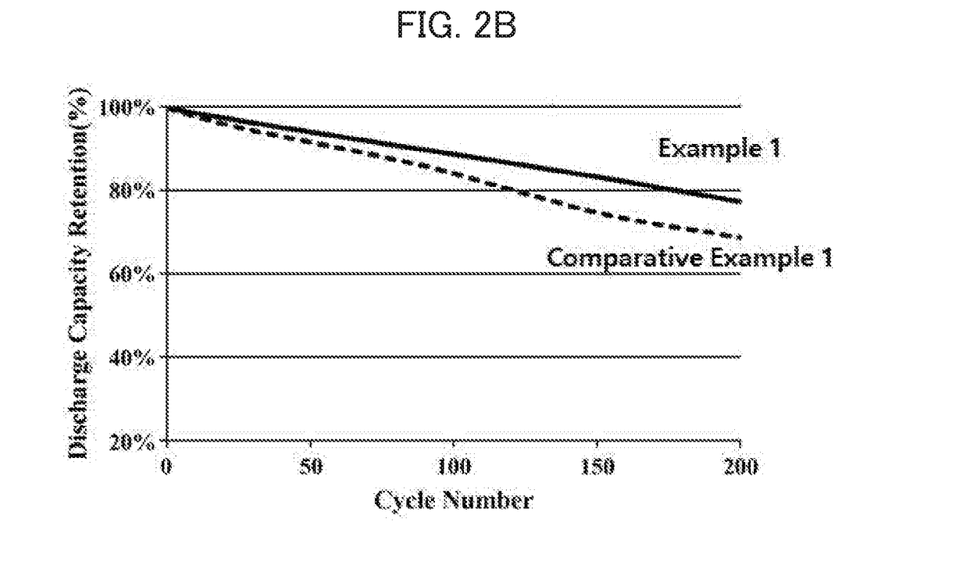
Figure 3A:
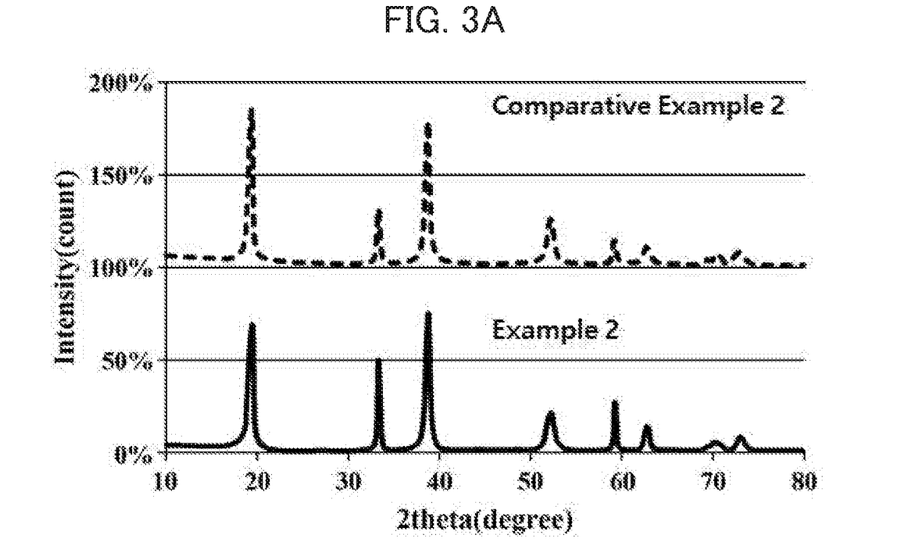
FIGS. 3A and 3B are graphs showing an XRD analysis of cathode active materials and a capacity retention analysis of lithium secondary batteries, respectively, in Example 2 and Comparative Example 2.
Figure 3B:
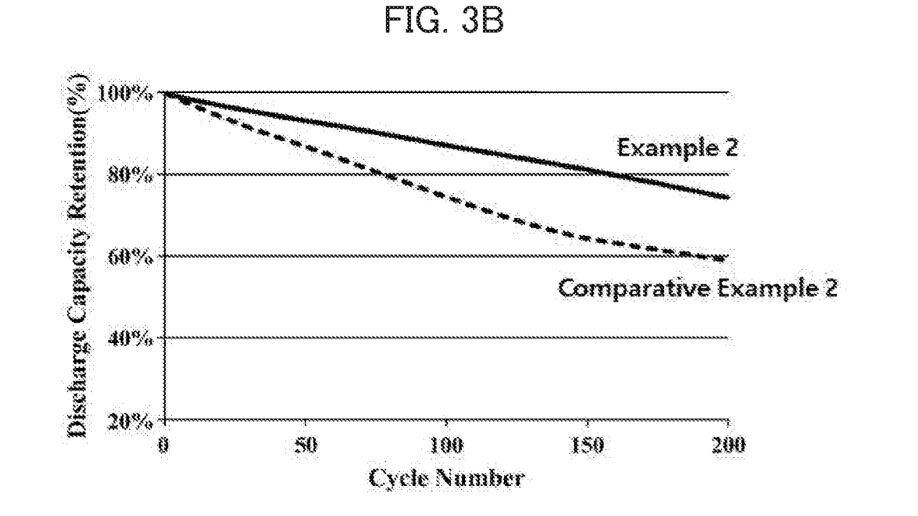
Figure 4A:
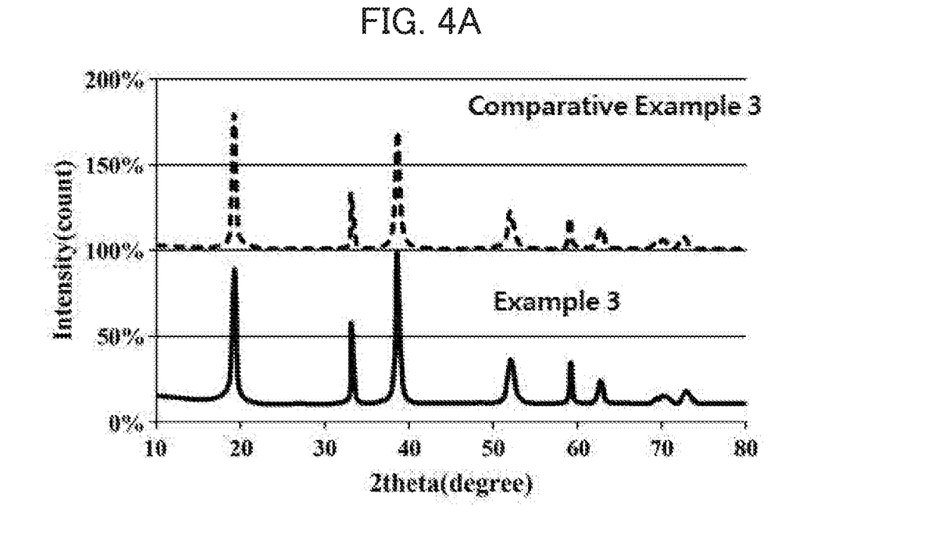
FIGS. 4A and 4B are graphs showing an XRD analysis of cathode active materials and a capacity retention analysis of lithium secondary batteries, respectively, in Example 3 and Comparative Example 3.
Figure 4B:
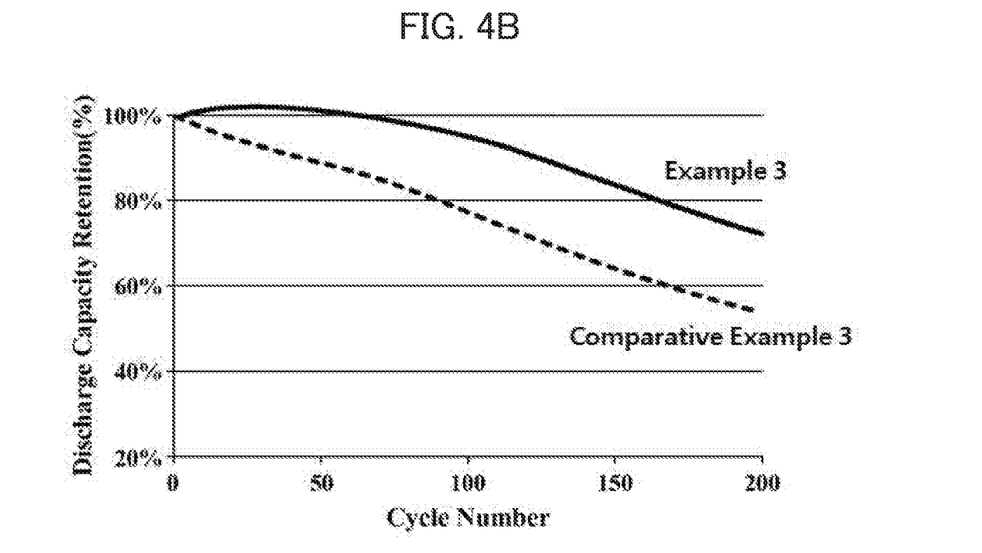
Figure 5A:
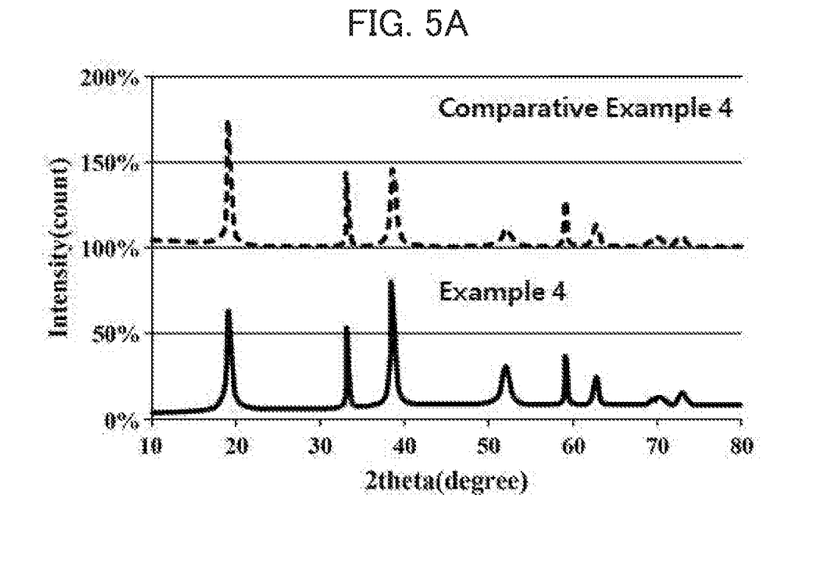
FIGS. 5A and 5B are graphs showing an XRD analysis of cathode active materials and a capacity retention analysis of lithium secondary batteries, respectively, in Example 4 and Comparative Example 4.
Figure 5B:
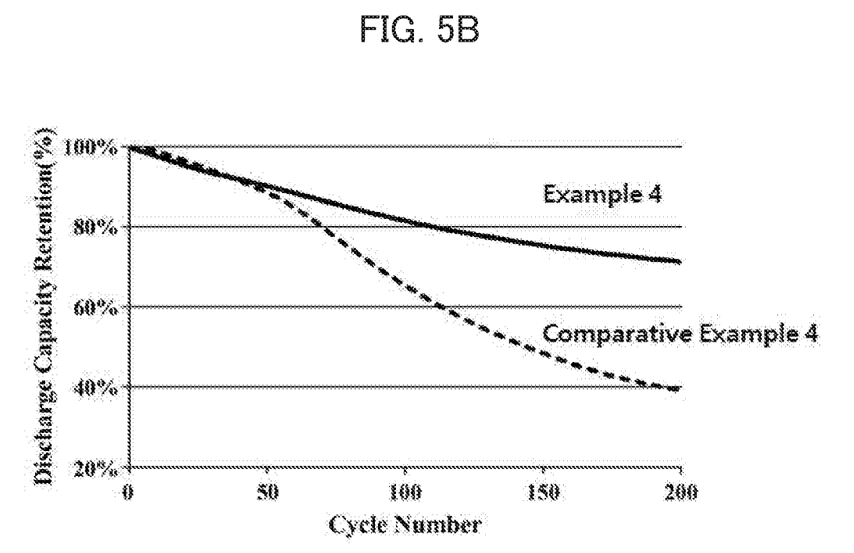

FIG. 1 is a schematic cross-sectional view illustrating a lithium secondary battery in accordance with some exemplary embodiments.

Referring to FIG. 1, a lithium secondary battery may include a cathode 130, an anode 140, and a separation layer 150 interposed between the cathode and the anode.

The cathode 130 may include a cathode active material layer 115 formed by coating the cathode active material on a cathode current collector 110. In exemplary embodiments, the cathode active material may be prepared using the cathode active material precursor according to the above-described exemplary embodiments.

The cathode active material precursor may be represented by, e.g., Chemical Formula 1 and may have about 1 or more of $A_{101}/A_{001}$. For example, the cathode active material represented by Chemical Formula 2 may be prepared using the cathode active material precursor. Accordingly, the lithium secondary battery having high power and high capacity stably maintained for a long period while increasing crystallinity of the cathode may be achieved.

The cathode active material may be mixed and stirred together with a binder, a conductive agent and/or a dispersive additive in a solvent to form a slurry. The slurry may be coated on the cathode current collector 110, and pressed and dried to form the cathode 130.

The cathode current collector 110 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC). For example, a PVDF-based binder may be used as a cathode binder. In this case, an amount of the binder for forming the cathode active material layer may be reduced, and an amount of the cathode active material may be relatively increased. Thus, capacity and power of the lithium secondary battery may be improved.

The conductive agent may be added to facilitate electron mobility between the active material particles. For example, the conductive agent may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$, etc.

In exemplary embodiments, the anode 140 may include an anode current collector 120 and an anode active material layer 125 formed by coating an anode active material on the anode current collector 120.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), etc. The crystalline carbon may include a graphite-based material such as natural graphite, graphitized cokes, graphitized MCMB, graphitized MPCF, etc. The lithium alloy may further include aluminum, zinc, bismuth, cadmium, antimony, silicon, lead, tin, gallium, or indium.

The anode current collector 120 may include gold, stainless-steel, aluminum, titanium, copper or an alloy thereof, preferably, may include copper or a copper alloy.

In exemplary embodiments, the anode active material may be mixed and stirred together with a binder, a conductive agent and/or a dispersive additive in a solvent to form a slurry. The slurry may be coated on the anode current collector 120, and pressed and dried to form the anode 140.

The binder and the conductive agent substantially the same as or similar to those as mentioned above may be used. In some embodiments, the binder for the anode may include an aqueous binder such as such as styrene-butadiene rubber (SBR) that may be used with a thickener such as carboxymethyl cellulose (CMC) so that compatibility with a carbon-based active material may be improved.

The separation layer 150 may be interposed between the cathode 130 and the anode 140. The separation layer 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separation layer may also include a non-woven fabric formed of a glass fiber with a high melting point, a polyethylene terephthalate fiber, or the like.

In some embodiments, an area and/or a volume of the anode 140 (e.g., a contact area with the separation layer 150) may be greater than that of the cathode 130. Thus, lithium ions generated from the cathode 130 may be easily transferred to the anode 140 without loss by sedimentation. Thus, improvements of both power and stability through using the cathode active material precursor or the cathode active material may be more easily implemented.

In exemplary embodiments, an electrode cell 160 may be defined by the cathode 130, the anode 140 and the separation layer 150, and a plurality of the electrode cells 160 may be stacked to form an electrode assembly having, e.g., a jelly roll shape. For example, the electrode assembly may be formed by winding, lamination or folding of the separation layer.

The electrode assembly may be accommodated in an outer case 170 together with an electrolyte to define the lithium secondary battery. In exemplary embodiments, the electrolyte may include a non-aqueous electrolyte solution.

The non-aqueous electrolyte solution may include a lithium salt and an organic solvent. The lithium salt may be represented by, e.g., $Li^+X^-$, and an anion of the lithium salt $X^-$ may include $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

An electrode tab may be formed from each of the cathode current collector 110 and the anode current collector 120 to extend to one end of the outer case 170. The electrode tabs may be welded together with the one end of the outer case 170 to form an electrode lead exposed at an outside of the outer case 170.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

EXAMPLES AND COMPARATIVE EXAMPLES

Example 1

(1) Preparation of Cathode Active Material Precursor $NiSO_4$, $CoSO_4$ and $MnSO_4$ were mixed with a ratio of 0.75:0.15:0.10, respectively, using distilled water from which internal dissolved oxygen was removed by bubbling with $N_2$ for 24 hours. The solution was added to a reactor at 50° C., and NaOH and $NH_3H_2O$ were used as a precipitation agent and a chelating agent, respectively, to proceed with a co-precipitation reaction for 48 hours to obtain 14 μm of $Ni_{0.75}Co_{0.15}Mn_{0.1}(OH)_2$ as a cathode active material precursor. The obtained precursor was dried at 80° C. for 12 hours, and then re-dried at 110° C. for 12 hours.

(2) Preparation of Cathode Active Material

Lithium hydroxide and the cathode active material precursor were added to a dry high-speed mixer in a ratio of 1.05:1 and uniformly mixed for 5 minutes. The mixture was put into a kiln and heated to 710° C. at a heating rate of 2° C./min, and maintained at 710° C. for 10 hours. Oxygen was passed through continuously at a flow rate of 10 mL/min during heating and maintaining. After the firing was completed, natural cooling was performed to room temperature, pulverised and classified to obtain $LiNi_{0.75}Co_{0.15}Mn_{0.1}O_2$ as a cathode active material.

(3) Fabrication of Secondary Battery

A slurry was prepared by mixing the cathode active material, carbon black as a conductive material and polyvinylidene fluoride (PVDF) as a binder with a weight ratio of 94:3:3. The slurry was uniformly applied to an aluminum foil having a thickness of 15 μm, and vacuum-dried at 130° C. to prepare a cathode for a lithium secondary battery. An electrode assembly was formed using the cathode, a lithium foil as a counter electrode and a porous polyethylene film (thickness: 21 μm) as a separator, and a coin half-cell type battery cell was manufactured based on a commonly known manufacturing process using the electrode assembly and a liquid electrolyte in which 1.0 M of LiPF6 was dissolved in a solvent including ethylene carbonate and ethyl methyl carbonate with a volume ratio of 3:7.

Comparative Example 1

$NiSO_4$, $CoSO_4$ and $MnSO_4$ were mixed with distilled water with a ratio of 0.75:0.15:0.10, respectively. The solution was added to a reactor at 60° C. and a co-precipitation reaction was performed for 24 hours using NaOH and $NH_3H_2O$ as a precipitation agent and a chelating agent to obtain 14 μm of $Ni_{0.75}Co_{0.15}Mn_{0.1}(OH)_2$ as a cathode active material precursor. The obtained precursor was dried at 80° C. for 12 hours and then re-dried at 110° C. for 12 hours.

A cathode active material and a secondary battery (a battery cell) were prepared by the same method as that described in Example 1 using the cathode active material precursor.

Example 2 and Comparative Example 2

A cathode active material precursor, a cathode active material and a secondary battery were prepared by the same method as those described in Example 1 and Comparative Example 1, respectively, except that $NiSO_4$, $CoSO_4$, and $MnSO_4$ were mixed with a ratio of 0.80:0.11:0.09.

Example 3 and Comparative Example 3

A cathode active material precursor, a cathode active material and a secondary battery were prepared by the same method as those described in Example 1 and Comparative Example 1, respectively, except that $NiSO_4$, $CoSO_4$, and $MnSO_4$ were mixed with a ratio of 0.88:0.09:0.03.

Example 4 and Comparative Example 4

A cathode active material precursor, a cathode active material and a secondary battery were prepared by the same method as those described in Example 1 and Comparative Example 1, respectively, except that NiSO$_4$, CoSO$_4$, and MnSO$_4$ were mixed with a ratio of 0.92:0.05:0.03.

Example and Example 6

A cathode active material precursor, a cathode active material and a secondary battery were prepared by the same method as those described in Example 2 except that NiSO$_4$, CoSO$_4$, and MnSO$_4$ were mixed with a ratio of 0.80:0.09:0.11 at a reaction temperature of 50° C. and 60° C., respectively.

Experimental Example (1) Measurement of A$_{101}$/A$_{001}$ and I$_{101}$/I$_{001}$ For each of the cathode active material precursor powders of Examples and Comparative Examples, peak areas and peak intensities of (001) plane and (101) plane were measured using Cu Kα ray as an X-ray diffraction light source at a scan rate of 0.02°/step within a range of 15° to 90° of a diffraction angle (2θ), and then A$_{101}$/A$_{0.01}$ and I$_{101}$/I$_{001}$ values were calculated.

(2) Measurement o Discharging Capacity

A charging (CC/CV 0.5C 4.3V 0.05CA CUT-OFF) and a discharging (CC 1.0C 3.0V CUT-OFF) were performed using the secondary batteries of Examples and Comparative Examples, and a discharging capacity was measured.

(3) Measurement o Discharge Capacity Retention

The cycle performed in the above-described measurement of 1C discharging capacity was repeated 200 times, and a capacity retention was evaluated as a percentage of a value obtained by dividing a discharge capacity at a 200th cycle by a discharge capacity at a first cycle.

The results are shown in Table 1 and FIGS. 2A and 2B to FIGS. 6A and 6B.

but drastic capacity reduction was prevented as in Comparative Examples by maintaining the ranges of A$_{101}$/A$_{001}$ and I$_{101}$/I$_{001}$.

What is claimed is:

1. A cathode active material precursor comprising Chemical Formula 1,

Ni$_{1-x-y-z}$Co$_x$Mn$_y$M$_z$(OH)$_{2+a}$     [Chemical Formula 1]

wherein 0.02≤x≤0.15, 0<y≤0.15, 0≤z≤0.1, 0.75≤1−x−y−z≤0.95, −0.5≤a≤0.1, and M includes at least one of Mg, Sr, Ba, B, Al, Si, Mn, Ti, Zr or W, wherein A$_{101}$/A$_{001}$ is 1 or more and I$_{101}$/I$_{001}$ is 1 or more, and A$_{101}$ is a peak area of (101) plane and A$_{001}$ is a peak area of (001) plane by an X-ray diffraction (XRD) analysis, and I$_{101}$ is a peak intensity of (101) plane and I$_{001}$ is a peak intensity of (001) plane by the XRD analysis.

2. The cathode active material precursor according to claim 1, wherein A$_{101}$/A$_{001}$ is in a range from 1 to 2.

3. The cathode active material precursor according to claim 1, wherein I$_{101}$/I$_{001}$ is in a range from 1 to 2.

4. The cathode active material precursor according to claim 1, wherein a molar content of Co is greater than a molar content of Mn.

5. A cathode active material obtained from the cathode active material precursor according to claim 1.

6. The cathode active material according to claim 5, wherein the cathode active material is represented by Chemical Formula 2:

Li$_{1+b}$Ni$_{1-x-y-z}$Co$_x$Mn$_y$M$_z$O$_{2+c}$     [Chemical Formula 2]

wherein, in Chemical Formula 2, −0.05≤b≤0.15, 0.02≤x≤0.15, 0<y≤0.15, 0≤z≤0.1, −0.5≤c≤0.1, and M includes at least one of Mg, Sr, Ba, B, Al, Si, Mn, Ti, Zr or W.

TABLE 1

| | | XRD analysis | | | | | Discharging | |
| --- | --- | --- | --- | --- | --- | --- | --- | --- |
| | Ni:Co:Mn ratio | A$_{001}$ | A$_{101}$ | A$_{101}$/A$_{001}$ | I$_{001}$ | I$_{101}$ | I$_{101}$/I$_{001}$ | Capacity (mAh/g) | Capacity Retention |
| Example 1 | 0.75:0.15:0.1 | 37718 | 40410 | 1.071 | 1943 | 2100 | 1.08 | 176 | 77% |
| Example 2 | 0.8:0.11:0.09 | 23766 | 25143 | 1.058 | 2343 | 2500 | 1.07 | 183 | 75% |
| Example 3 | 0.88:0.09:0.03 | 37282 | 41865 | 1.123 | 1962 | 2200 | 1.12 | 186 | 73% |
| Example 4 | 0.92:0.05:0.03 | 19803 | 23533 | 1.189 | 1944 | 2300 | 1.18 | 193 | 71% |
| Example 5 | 0.80:0.09:0.11 | 27599 | 40401 | 1.464 | 1632 | 2400 | 1.47 | 183 | 71% |
| Example 6 | 0.80:0.09:0.11 | 18790 | 32104 | 1.709 | 1301 | 2400 | 1.85 | 183 | 63% |
| Comparative Example 1 | 0.75:0.15:0.1 | 30401 | 27599 | 0.908 | 2200 | 1984 | 0.90 | 176 | 69% |
| Comparative Example 2 | 0.8:0.11:0.09 | 40402 | 37871 | 0.937 | 2100 | 2003 | 0.95 | 183 | 59% |
| Comparative Example 3 | 0.88:0.09:0.03 | 31682 | 29108 | 0.919 | 2500 | 2303 | 0.92 | 186 | 54% |
| Comparative Example 4 | 0.92:0.05:0.03 | 26104 | 18790 | 0.720 | 2300 | 1612 | 0.70 | 193 | 39% |

Referring to Table 1 and FIGS. 2A and 2B to FIGS. 6A and 6B, the cathode active material precursors of Examples having A$_{101}$/A$_{001}$ and I$_{101}$/I$_{001}$ values of 1 or more provided the capacity retention of 70% or more. However, in Comparative Examples, the capacity retentions were drastically decreased after 200 cycles under the same compositions and capacities. Particularly, as the content of Ni increased, the long-term stability rapidly deteriorated.

Figure 6A:
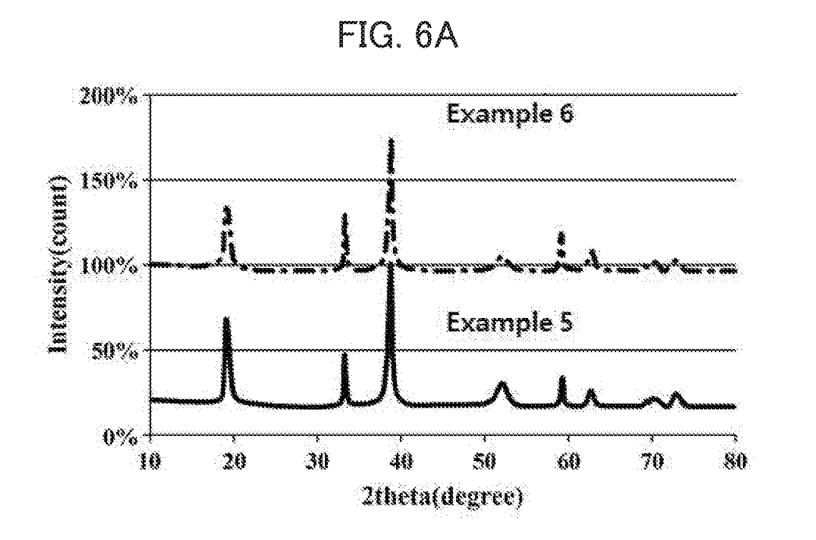
FIGS. 6A and 6B are graphs showing an XRD analysis of cathode active materials and a capacity retention analysis of lithium secondary batteries, respectively, in Example 5 and Example 6.
Figure 6B:
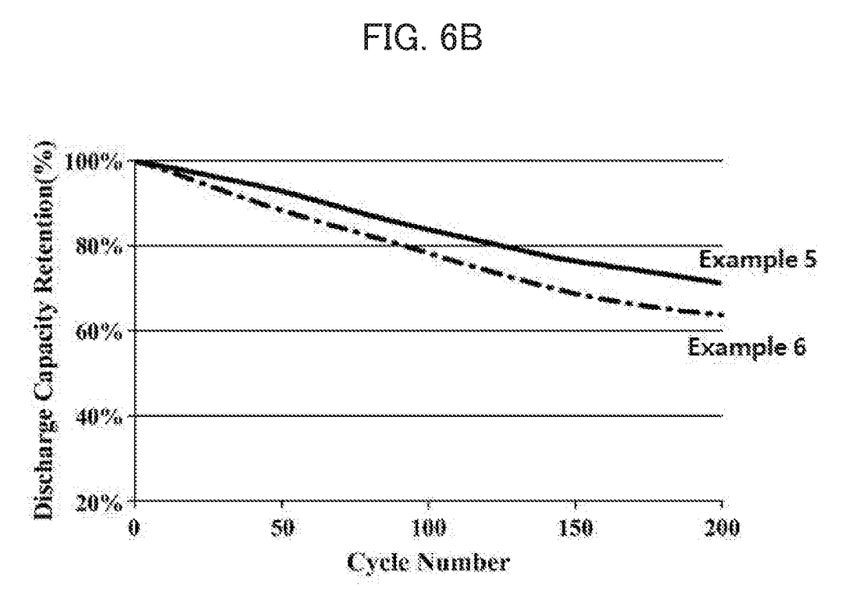

Referring to FIGS. 6A and 6B, in Example 6, as the values of A$_{101}$/A$_{001}$ and I$_{101}$/I$_{001}$ slightly were increased, the capacity retention was decreased compared to that of Example 5, 7. The cathode active material according to claim 5, wherein a length of a major axis of a primary particle is 1.5 to 7 times a length of a minor axis of the primary particle.

8. A lithium secondary battery comprising:
a cathode including a cathode active material obtained from the cathode active material precursor according to claim 1;
an anode; and
a separation layer disposed between the cathode and the negative anode.

* * * * *